PROTECTION OF SEMICONDUCTIVE DEVICES BY GASEOUS AMBIENTS

Filed June 8, 1955

INVENTORS: W. H. BRATTAIN
C. G. B. GARRETT
BY John C. Morris
ATTORNEY

United States Patent Office 2,777,974

Patented Jan. 15, 1957

2,777,974

PROTECTION OF SEMICONDUCTIVE DEVICES BY GASEOUS AMBIENTS

Walter H. Brattain, Chatham, and Charles G. B. Garrett, Morristown, N. J., assignors to Bell Telephone Laboratories, Incorporated, New York, N. Y., a corporation of New York Application June 8, 1955, Serial No. 514,038

16 Claims. (Cl. 317—234)

This invention relates to translating devices each of which comprises a body of semiconductive material and to a method of controlling the surface characteristics of such a body to prevent or inhibit undesired conducting paths at or closely adjacent to the surface. More particularly, this invention is concerned with translating devices in which the semiconductor is germanium material having contiguous zones of "n" conductivity type and of "p" conductivity type.

In the interest of convenience and brevity, "n" conductivity type semiconductive material in which the majority carriers of electric charge are electrons and "p" conductivity type semiconductive material in which the majority carriers are holes have been respectively designated as n-type material and p-type material. These shortened expressions will, in general, be used in this specification and the appended claims to designate the noted conductivity types.

It has been generally recognized in the art that the existence of leakage paths on or near the surface of a semiconductive body can, and in many cases does, degrade the performance of translating devices comprising such bodies. Furthermore, it appears that environmental conditions may contribute to the creation of such leakage paths.

This invention involves control of the environment in which a semiconductive body operates by the envelopment of the body in a suitable ambient atmosphere.

An object of this invention is to improve the performance characteristics of semiconductive devices by inhibiting deleterious leakage paths at or near the surface thereof.

A more specific object of this invention is to improve translating devices comprising germanium bodies so constructed and arranged that a zone of p-type material of relatively narrow extent abuts a zone of n-type material of broader extent, whereby the conduction paths adjacent the surface of the p-type zone are short as compared with those of the n-type zone.

A feature of this invention resides in the method of making a translating device comprising a semiconductive body having contiguous zones of n-type and p-type germanium, which method includes surrounding the body with an enclosure, filling the enclosure with oxygen, and sealing the enclosure.

A further feature of this invention includes steps of cleaning the surface of the germanium body by removing deleterious materials therefrom and thereafter protecting said surface until it is permanently surrounded by oxygen.

Another feature of this invention lies in a translating device comprising a body having contiguous zones of n-type and of p-type germanium enclosed in an oxygen-filled envelope.

Other and further objects and features will appear more fully and clearly in the following descriptions of exemplary embodiments of the invention taken in connection with the appended drawing in which.

Figure 1:
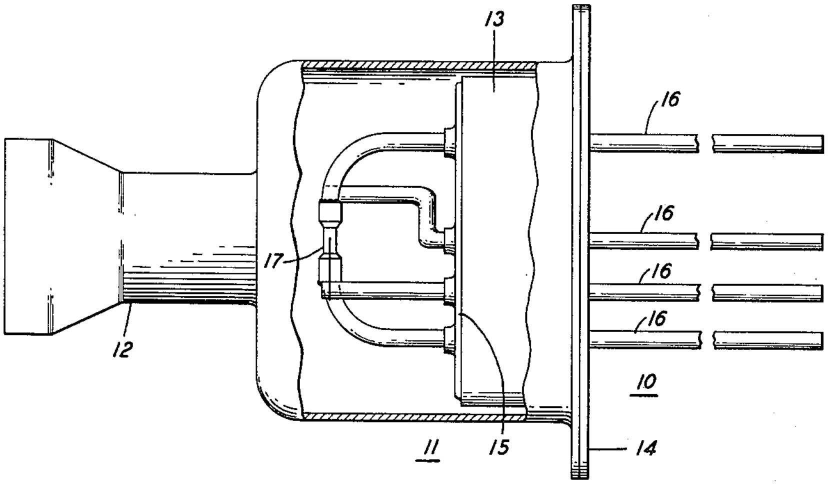
Fig. 1 is a view in elevation with parts broken away to reveal internal structure, of a translating device to which this invention applies.
Figure 2:
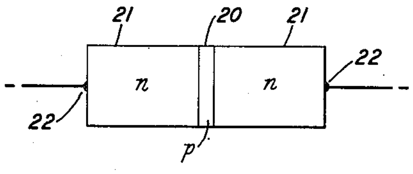
Fig. 2 is a diagrammatic view of an n–p–n grown junction translating device.

One translating device to which this invention has been applied is an n–p–n grown junction transistor, as shown diagrammatically in Fig. 2. Such a device may, as illustrated in Fig. 1, be mounted on a base 10 and enclosed by an envelope or cover 11 sealed to the base. The envelope has a conventional tubulation 12 for exhausting gas from or introducing gas into the envelope. The base may comprise a sleeve or collar 13 of metal having a flange 14 at one end. The sleeve 13 encloses and is sealed to a body or header 15 of glass or the like. A plurality of conductors 16 sealed through the header 15 serve as supports for the n–p–n bar 17 on the inside of the envelope and as terminals on the outside.

In the fabrication of this device the germanium bar 17 is secured at its ends between two of the support conductors 16, and connections are made between two other conductors 16 and the intermediate p-type zone. The germanium bar is then cleaned to remove surface contaminants. This may be done by etching in a mixture of 25 parts nitric acid and 3 parts hydrochloric acid. The bar is then stream washed successively in deionized water and ethyl alcohol and then blown dry with nitrogen. The cover is then immediately placed on the base and sealed thereto as by welding, or the base assembly with the cleaned bar is kept in dry nitrogen until time for encapsulation. The envelope is then evacuated and back filled with oxygen via the tubulation 12. The tubulation is then sealed off as by pinching and welding.

In an n–p–n grown junction translator of the type described and shown diagrammatically in Fig. 2, the intermediate p-type zone 20 is very thin and the flanking n-type zones 21 are relatively thick between the p–n junctions and the metallic electrodes 22. Thus, the carrier paths through the n-type zones are long and those through the p-type zone are short. Leakage paths that would be deleterious to this type of device are so-called channels of n–type material at or near the surface of the p–type zone.

The effect of the ambient oxygen atmosphere is to form at or adjacent to the surface of both the n–type and the p-type zones a layer of p-type material. Thus, leakage paths or n–type channels will not form on the p–type zone, or any that may have started to form will be eliminated by being converted to p–type material. For the length of the charge-conducting path involved the cross section of the p–type layer which is on the surface of the n–type material is so small compared to the cross section of n–type material available for carrier conduction that this portion of the p–type layer has no significant effect.

Figure 3:
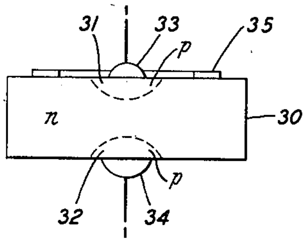
Figs. 3 and 4 are diagrammatic views of a p–n–p alloy junction translating device, said diagrammatic views being for the purpose of explaining details of the invention.
Figure 4:
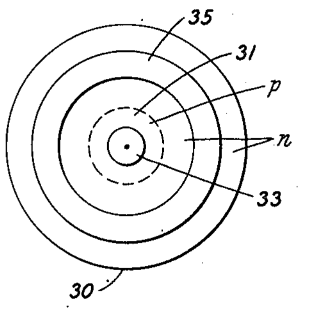

Another translating device that benefits from the application of this invention is a p–n–p alloy junction device. In such a device, as diagrammatically shown in Figs. 3 and 4, a body or disc 30 of n-type material has zones 31 and 32 of p–type material alloyed into each of two opposite faces. Electrodes 33 and 34 make connection to these zones respectively. A connection to the n-type zone is made by means of a metal ring 35 secured to the body and surrounding but spaced from one of the other electrodes.

The p-type zones may be formed by applying a button of alloying metal, which is an acceptor or p–type forming impurity, to the body 30 and heating to diffuse the impurity into the body for a short distance around the button. The button then serves as an electrode and the diffused portion as a p–type zone. A suitable acceptor impurity is indium or gallium.

In a device of this type the carrier paths from the p–n junctions through the p–type zones to the electrodes are relatively short and of small section, whereas the paths from the electrode 35 through the n–type material are longer and of greater cross section. A device of this type may be mounted in an envelope similar to that used for the n–p–n translator previously described.

By cleaning the surface of the semiconductive body, maintaining the cleanliness, encapsulating the body, and surrounding it with oxygen, the same desirable effect may be had with this device as with the n–p–n grown junction device. The p–type forming effect of the oxygen prevents or eliminates n–type channels at or near the surface of the short, small cross section p–type zones, and any thin p–type layer which may form on the n–type zone is insufficient to short-circuit said zone.

This invention is not restricted to the particular modifications of translating device that have been described, but is applicable to other translating devices of germanium material having contiguous n–type and p–type zones and in which the carrier paths at or near the surface are relatively short in the p–type zone and relatively long in the n–type zone and the bulk of the n–type zone is such as to provide carrier paths that are sufficient to dominate over any p–type paths that may be formed at or near the surface of the n–type zone.

What is claimed is:

1. The method of preventing n-type channels in the p–type zone of a circuit element including contiguous zones of n–type and of p–type germanium, having means for making electrical connection to said zones, and in which the superficial extent of the p–type germanium is less than that of the n–type germanium; that comprises cleaning the surface of the element, enclosing the element in an envelope while maintaining the surface cleanliness, evacuating the envelope, filling the envelope with oxygen, and sealing the envelope.

2. The method of preventing n-type channels in the p–type zone of a circuit element including contiguous zones of n–type and of p–type germanium, having means for making electrical connection to said zones, and in which the superficial extent of the p–type germanium is less than that of the n–type germanium; that comprises removing deleterious material from the surface of the element, enveloping said surface with a temporarily protective ambient atmosphere, mounting the protected element in a closure, displacing the temporary atmosphere with oxygen, and sealing the closure.

3. The method of preventing leakage paths at the surface of the p–type zone of a semiconductive translator including a body of germanium material comprising a thin zone of p–type germanium between relatively thick zones of n–type germanium that comprises enclosing said body, removing the existing ambient atmosphere from the body, surrounding the body with oxygen, and maintaining oxygen around said body.

4. The method of preventing leakage paths at the surface of the p–type zone of a semiconductive translator including a body of germanium material comprising a thin zone of p–type germanium between relatively thick zones of n–type germanium that comprises enclosing the body in an envelope, evacuating the envelope, filling the envelope with oxygen, and hermetically sealing said envelope.

5. The method of preventing leakage paths at the surface of the p–type zone of a semiconductive translator including a body of germanium material comprising a thin zone of p–type germanium between relatively thick zones of n–type germanium that comprises removing contaminating material from the surface of the body, protecting said body from contamination, enclosing said body, removing the existing ambient atmosphere from the body, surrounding the body with oxygen, and maintaining oxygen around the body.

6. The method of preventing leakage paths at the surface of the p–type zones of a semiconductive translator including a body of n–type germanium material having two spaced relatively small zones of p–type material therein, that comprises enclosing said body, removing the existing ambient atmosphere from the body, surrounding the body with oxygen, and maintaining oxygen around said body.

7. The method of preventing leakage paths at the surface of the p–type zones of a semiconductive translator including a body of n–type germanium material having two spaced relatively small zones of p–type material therein that comprises enclosing the body in an envelope, evacuating the envelope, filling the envelope with oxygen, and hermetically sealing said envelope.

8. The method of preventing leakage paths at the surface of the p-type zones of a semiconductive translator including a body of n-type germanium material having two spaced relatively small zones of p-type material therein that comprises removing contaminating material from the surface of the body, protecting said body from contamination, enclosing said body, removing the existing ambient atmosphere from the body, surrounding the body with oxygen, and maintaining oxygen around the body.

9. The method of preserving the p-type conductivity of the surface of a p-type zone of a germanium semiconductive body having contiguous zones respectively of n-type and p-type material that comprises enclosing the body in an envelope, evacuating the envelope, filling the evacuated envelope with oxygen, and sealing the envelope.

10. The method of stabilizing a germanium semiconductive circuit element having contiguous zones of p-type and n-type germanium that comprises enclosing the element in a sealable envelope, evacuating the envelope, filling the envelope with oxygen, and sealing the envelope.

11. A semiconductive device comprising a body of germanium material having contiguous zones respectively of n-type and p-type material, the superficial extent of the p-type zone being less than that of the n-type zone, an envelope, means for mounting the body in the envelope, and means for maintaining the p-type conductivity of the surface of the p-type zone consisting of an ambient atmosphere of oxygen sealed within said envelope.

12. A semiconductive device comprising a body of germanium material including a thin zone of p-type germanium between relatively thick zones of n-type germanium, an envelope, means for mounting the body in the envelope, and means for maintaining the p-type conductivity of the surface of the p-type zone consisting of an ambient atmosphere of oxygen sealed within said envelope.

13. A semiconductive device comprising a body of n-type germanium material having spaced, relatively small zones of p-type germanium therein, an envelope, means for mounting the body in the envelope, and means for maintaining the p-type conductivity of the surface of the p-type zones consisting of an ambient atmosphere of oxygen sealed within said envelope.

14. A semiconductive device comprising a body of germanium having spaced, broad zones of n-type material and an intervening narrow zone of p-type material, an envelope, means for mounting the body in the envelope, and means for maintaining the p-type conductivity of the surface of the p-type zone consisting of an ambient atmosphere of oxygen sealed within said envelope.

15. A semiconductive device comprising a body of germanium having contiguous zones respectively of n-type and p-type material, an envelope, means for mounting the body in the envelope, and means for maintaining the p-type conductivity of the surface of the p-type zone consisting of an ambient atmosphere of oxygen sealed within said envelope.

16. A semiconductive device comprising a body of germanium having contiguous zones respectively of n-type and p-type material, means for making electrical connection to said zones, an envelope, means for mounting the body in the envelope, and means for maintaining the p-type conductivity of the surface of the p-type zone consisting of an ambient atmosphere of oxygen sealed within said envelope.

No references cited